G. H. DAVIS AND W. G. GRIFFIN.
AUXILIARY TRACTOR FOR MOTOR VEHICLES.
APPLICATION FILED JAN. 11, 1915. RENEWED APR. 26, 1919.

1,340,024.  Patented May 11, 1920.
4 SHEETS—SHEET 1.

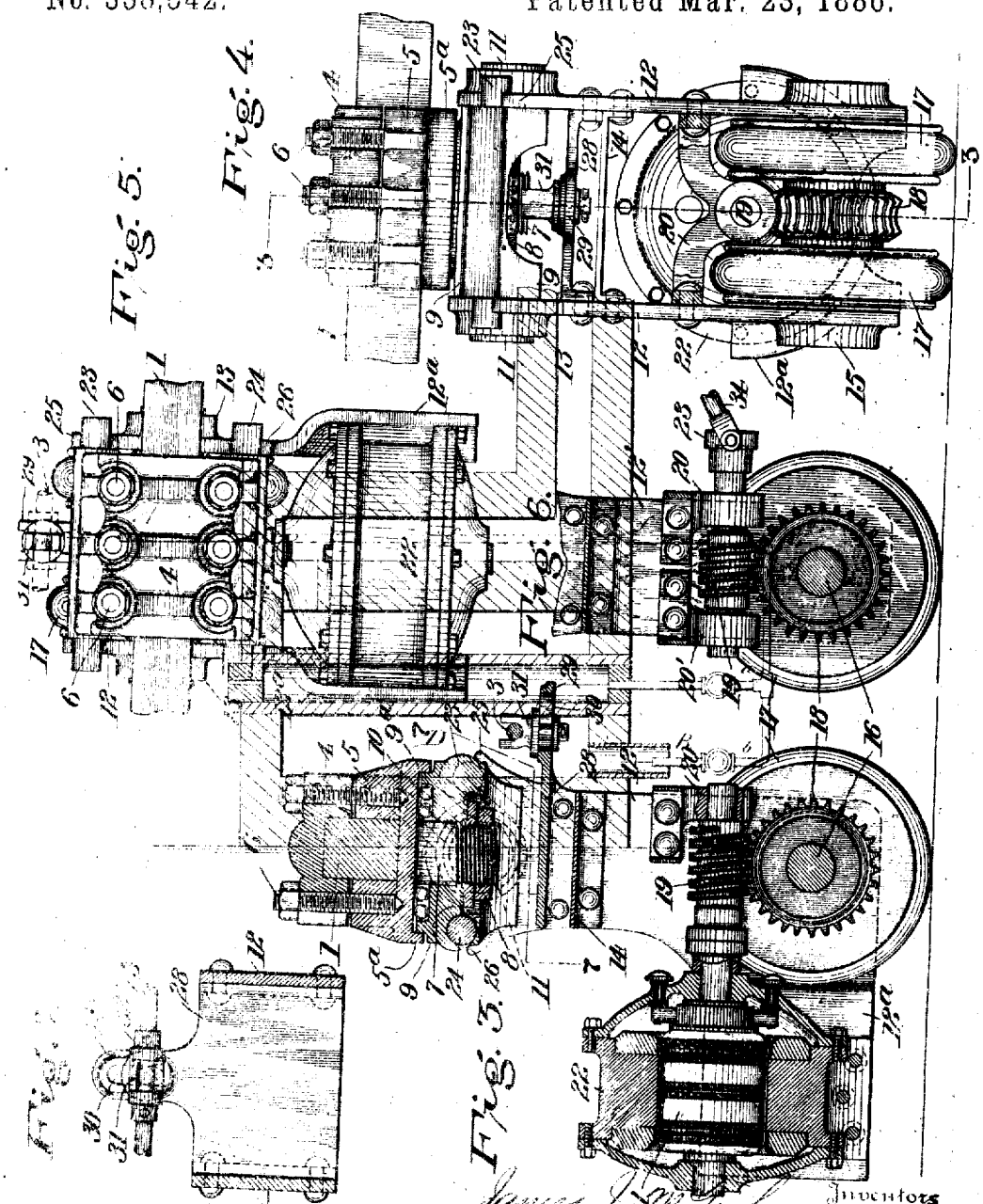

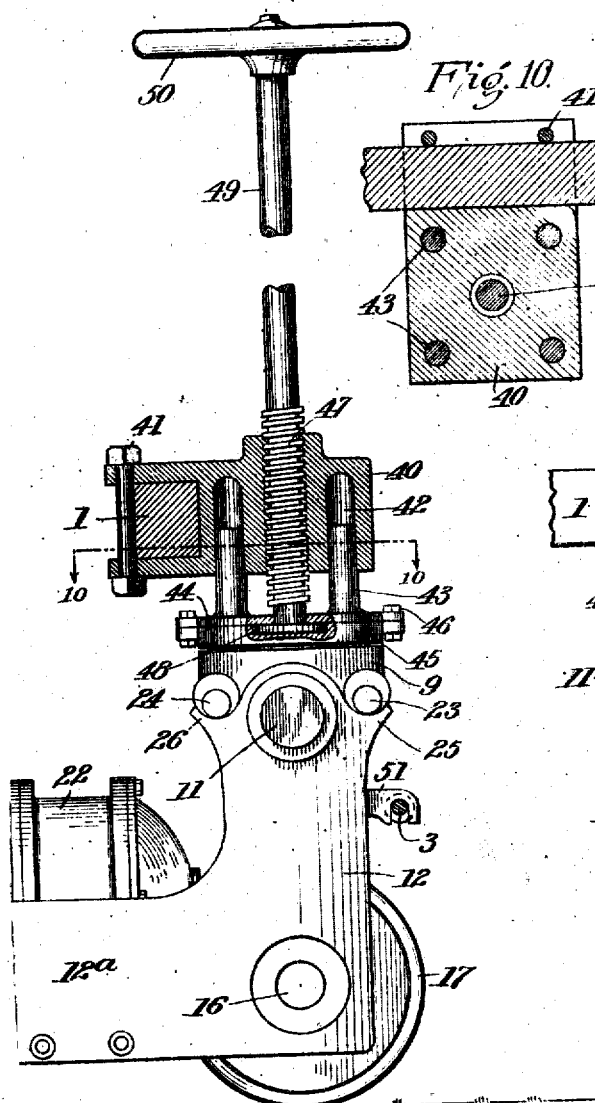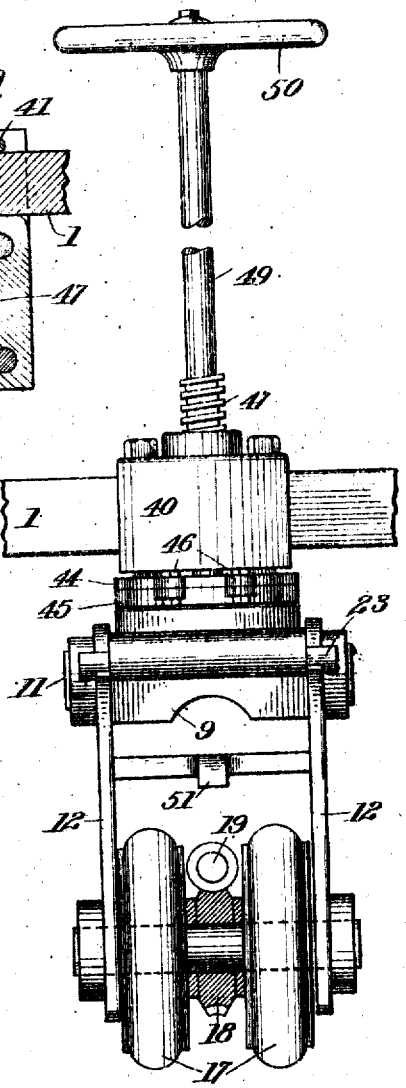

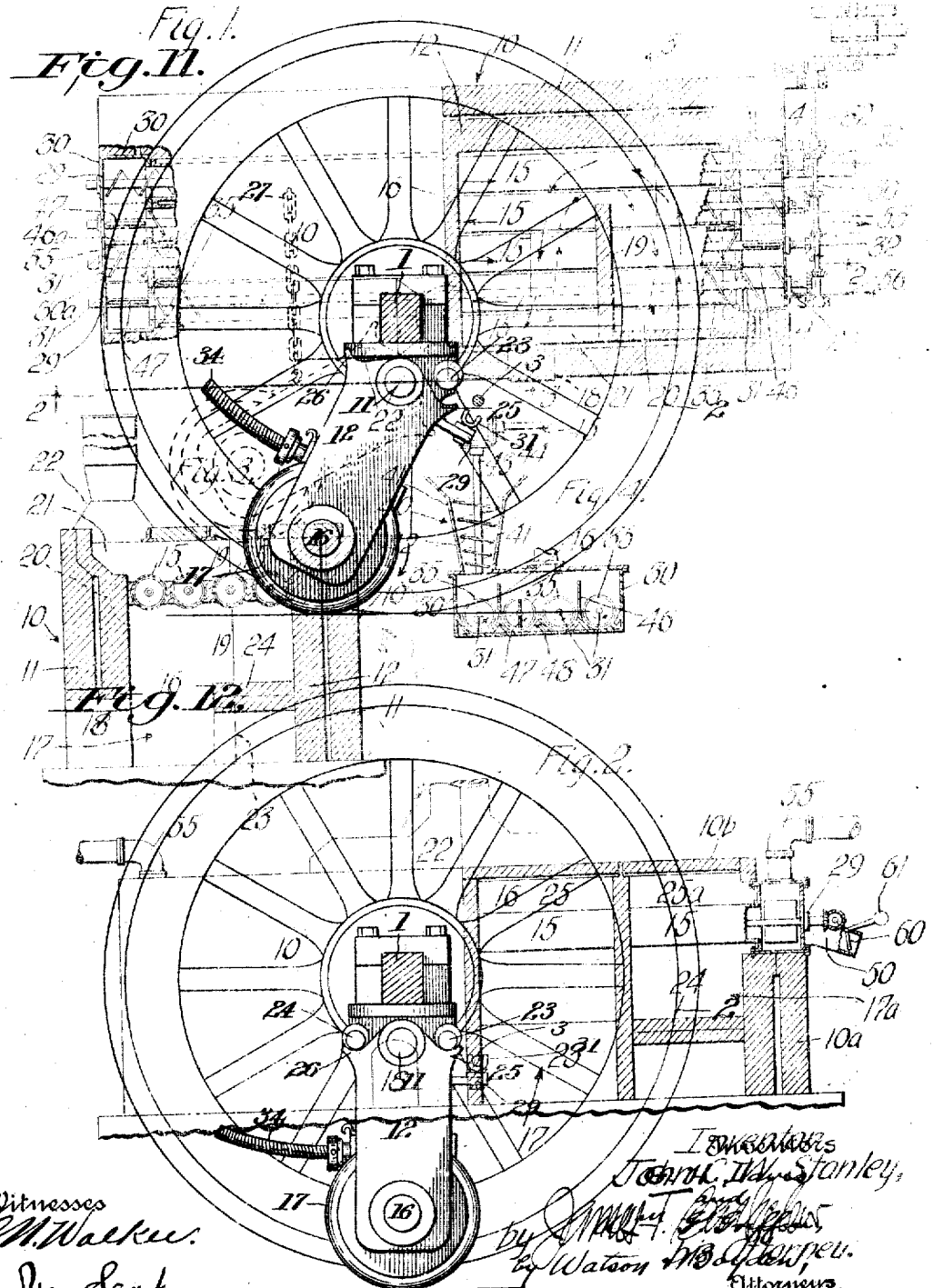

UNITED STATES PATENT OFFICE.

GEORGE H. DAVIS, OF PORTLAND, MAINE, AND WILLIAM G. GRIFFIN, OF WASHINGTON, DISTRICT OF COLUMBIA, ASSIGNORS, BY DIRECT AND MESNE ASSIGNMENTS, OF ONE-HALF TO SAID DAVIS AND ONE-HALF TO EDWARD T. BURROWES, OF PORTLAND, MAINE.

AUXILIARY TRACTOR FOR MOTOR-VEHICLES.

1,340,024.      Specification of Letters Patent.      Patented May 11, 1920.

Application filed January 11, 1915, Serial No. 1,611. Renewed April 26, 1919. Serial No. 293,016.

*To all whom it may concern:*

Be it known that we, GEORGE H. DAVIS and WILLIAM G. GRIFFIN, citizens of the United States, residing, respectively, at Portland, in the county of Cumberland and State of Maine, and at Washington, in the District of Columbia, have invented certain new and useful Improvements in Auxiliary Tractors for Motor-Vehicles, of which the following is a specification.

This invention relates to an auxiliary tractor device for motor vehicles.

As is well known, motor vehicles are usually propelled by means of the rear wheels, the front wheels being pivoted so that the direction of movement of the vehicle may be controlled. The thrust or driving effort of the rear or traction wheels, is, of course, always exerted straight ahead, and when the front wheels are turned at a sharp angle only a very small component of this thrust is available in the direction in which the wheels are set. On this account it is extremely difficult to make short turns with such vehicles, especially heavy trucks.

Moreover, it is often necessary or desirable that, in loading or unloading freight, motor vehicles enter very narrow or restricted spaces. Under such circumstances, it frequently happens that a driver finds it impossible to extricate his machine from such restricted space, owing to the close proximity of other vehicles or some obstruction, and is thus caused much inconvenience. Such a condition is due both to the inability of a motor vehicle to make short turns, as above explained, and to the fact that it has heretofore been impossible to move the front of such machines laterally, as can be done with most horse drawn vehicles.

The main object of the present invention is, therefore, to provide an auxiliary tractor attachment by means of which the front wheels of a vehicle can be lifted clear of the ground and the front end of the vehicle swung laterally and bodily around, as may be desired. By this means it will be possible to shift the vehicle free of obstructions, and set it in such position that the usual rear traction wheels can effectively propel it.

Another object is to provide an auxiliary tractor which may be readily attached to existing types of motor vehicles, without necessitating any serious changes in their construction.

It is obvious that such a tractor device may be made to operate in a number of different ways, either by hand, by an independent motor, or by power derived from the main propelling means on the vehicle. Therefore, the accompanying drawings, forming part of this specification and disclosing several embodiments of the invention, are to be regarded as illustrative only.

In order that the invention may be clearly understood, reference is had to such drawings, in which, Figure 1 is a front view of a motor truck showing our auxiliary tractor device attached thereto, and illustrating the same in operative position;

Fig. 3 is a central longitudinal section on an enlarged scale, through the tractor itself, showing one method of driving the same;

Fig. 4 is a front elevation of the tractor shown in Fig. 3;

Fig. 5 is a plan view thereof;

Fig. 6 is a fragmentary section, similar to Fig. 3, but showing a different method of driving the tractor wheels;

Fig. 7 is a horizontal section substantially on the line 7—7 of Fig. 3;

Fig. 8 is a side elevation, partly in section, showing another method of mounting the auxiliary tractor on the vehicle, and illustrating the same in operative position;

Fig. 9 is a front elevation thereof, illustrating the device in inoperative position;

Fig. 10 is a horizontal section substantially on the line 10—10 of Fig. 8; and,

Figs. 11 and 12 are conventional side elevations of the tractor, showing the same in different positions, and illustrating one method of bringing the device into operation.

Figure 1:
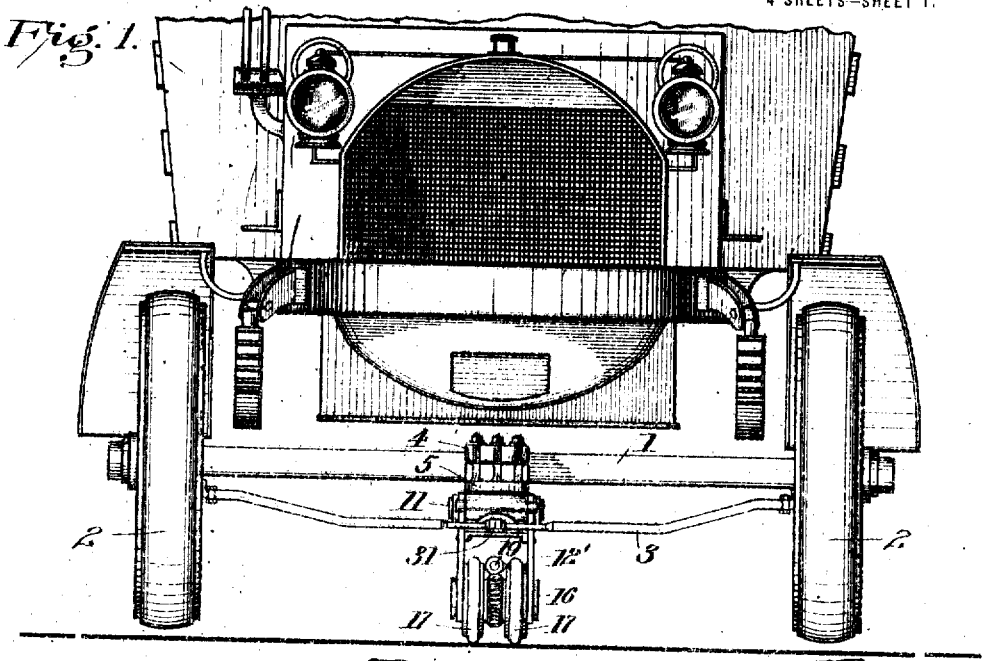

Referring to the drawings in detail, 1 designates the usual front axle of a motor vehicle such, for example, as a delivery truck. 2 indicates the front wheels, which may be mounted on pivoted stub spindles in a well known manner, 3 designates the usual steering rod connecting the front wheels so that they may be turned in any desired direction by means of suitable steering gear (not shown).

Our auxiliary tractor device is designed to be attached directly to the front axle, substantially at its middle. In order to furnish convenient and efficient means for securing the tractor to the axle, we provide a bearing member formed of upper and lower sections 4 and 5, adapted to be clamped around the axle by means of bolts 6, as clearly shown in Figs. 3, 4, and 5. The lower section 5 is provided with a central depending boss 7, the lower end of which is screw-threaded.

A block 9 is swiveled on the boss 7, and is secured in position by means of a suitable washer and nut 8, engaging the screw-threaded end of the boss 7. The upper surface of the block 9 is cut to form a raceway for suitable ball bearings 10, which also engage the underface of the section 5. The elements 5 and 9 are preferably provided with concentric overlapping flanges 5ª and 9ª, respectively, for the purpose of retaining the balls in position and excluding dust and dirt. While the above described construction of swiveled block is strong and efficient, it will, of course, be understood that other constructions may be employed without departing from the spirit of the invention.

Projecting from opposite sides of the block 9 are trunnions 11, on which are pivotally mounted the side members 12 of a fork or bracket which carries the tractor wheels. Such side members are preferably provided with bearings 13, engaging the trunnions 11, and may be suitably braced by means of a plate 14. At their lower ends the bracket members 12 are provided with journals 15, in which freely turns a shaft 16. On the shaft 16 are rigidly secured a pair of tractor wheels 17, preferably provided with solid rubber tires. These wheels are spaced apart, and between them is rigidly secured a worm gear 18.

Meshing with this worm gear is a worm 19, suitably journaled at one end in a bracket 20, supported by the side members 12 and directly coupled at its other end to the armature 21 of an electric motor 22. This motor is supported between rearwardly projecting cheek plates or extensions 12ª, preferably formed integral with the members 12. In fact, each piece comprising the members 12 and 12ª may be conveniently pressed from sheet steel.

At one side of the trunnions 11, the block 9 carries a pair of alined cylindrical bosses 23, and at the other side the block is formed with an opening adapted to receive a similarly shaped pin 24, the bosses 23 and pin 24 lying parallel with each other and with the trunnions 11. Each of the members 12 is formed at its upper end with concave shoulders 25 and 26, adapted to engage the bosses 23 and pin 24, respectively.

In order that the tractor wheels may be turned in any desired direction so as to guide the machine, we preferably provide means by which they may be operated through the usual steering gear of the vehicle. To this end, a plate 28 is secured between the side members 12, and provided with a central forwardly extending portion 29, having an elongated slot 30. In this slot is secured the stem of a small yoke or fork 31, which is adapted to engage the steering rod 3, as clearly shown in Fig. 3. The yoke is adjustable on the plate 28, so as to enable it to be accurately positioned relative to the steering rod. Collars 32 are secured to the steering rod 3, at each side of the yoke 31, as shown in Fig. 7.

The electric motor drive illustrated in Figs. 3, 4, and 5 is especially adapted for use in connection with electrically propelled vehicles carrying storage batteries. It will, of course, be understood that connections are provided between the usual storage battery and the motor, and that suitable controlling switches will be located within convenient reach of the driver. It has not been thought necessary to illustrate the circuits or control switches, as any well known system of control may be employed.

Figure 2:
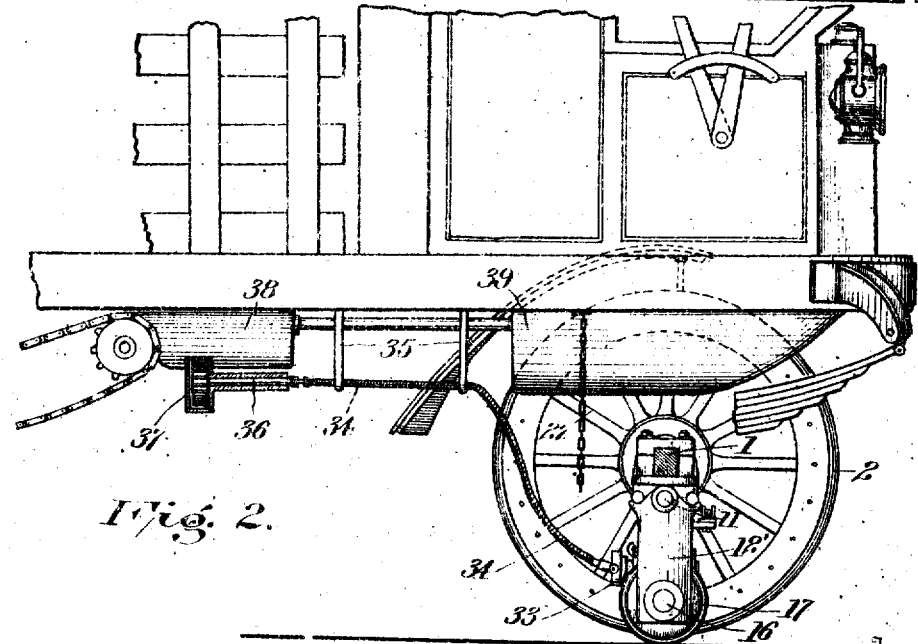
Fig. 2 is a fragmentary side elevation of the truck and tractor, parts being in section and parts being broken away.

In the case, however, of vehicles propelled by means of internal combustion or steam motors, the tractor wheels may be driven by means of a flexible shaft from the power plant. By reference to Fig. 6, it will be seen that the same worm 19 is employed, being supported by suitable brackets 20 and 20', and provided at one end with a coupling 33, to which is secured one end of a suitable flexible shaft 34. This shaft (see Fig. 2) may be supported in suitable brackets 35, and connected at its other end with a counter-shaft 36, carrying a gear 37, supported in any convenient way upon the usual gear box 38, and in mesh with a low speed gear in said box. The gearing in the box 38 is, of course, driven by means of the usual engine (not shown) in the casing 39.

Normally the pin 24 is removed and the tractor swung rearwardly and upwardly about the trunnions 11 to the position indicated by dotted lines in Fig. 11, in which position it may be retained by means of a suitable chain 27, or the like. By suitably designing the parts, the tractor may be arranged to swing as high above the ground as may be found necessary. When it is desired to use the device, the chain is unhooked and the tractor allowed to swing down into the position shown in Fig. 11. Power is then applied to the tractor wheels, either by means of the electric motor 22, or the flexible shaft 34, so as to turn them in the direction indicated by the arrow. This will cause the wheels to travel forward and force themselves under the axle, swinging the bracket 12 about the trunnions 11 until the shoulders 25 engage the bosses 23, thus exerting a kind of toggle action and lifting the front wheels 2 clear of the ground, as illustrated in Fig. 12. In other words, the weight of the front part of the truck is thus shifted from the front wheels to the tractor wheels. The pin 24 is then inserted in the hole made for it, thus securing the bracket rigidly in position. Thereupon, the steering wheel may be turned so as to set the tractor at any desired angle, and then upon applying power to the wheels, the front of the vehicle will be carried around as far as may be necessary to clear the obstruction. It will be understood, of course, that when the tractor bracket moves from the position shown in Fig. 11 to that illustrated in Fig. 12, the fork 31 is swung up into engagement with the steering rod 3.

It will also be apparent that while we have illustrated and described a tractor as being operated by the usual steering gear of the vehicle, special auxiliary steering gear may be provided if desired.

Instead of forcing the tractor under the axle by its own power as above described, means may be provided for positively raising and lowering the tractor wheels, such means being controlled by the driver. In Figs. 8, 9, and 10, we have illustrated such an arrangement.

Referring to these figures, 40 designates a block or bracket which may be secured to the axle 1 in any desired manner, as, for example, by bolts 41, and which projects to one side of said axle. In the lower part of the block 40 are formed a plurality of guideways 42, into which guideways loosely extend pins or rods 43, which are rigidly secured to and carried by a plate 44. A similar plate 45 is secured to the plate 44, as by means of bolts 46, and has a swiveled connection with the block 9, which carries the tractor. The block 40 is provided with a centrally disposed screw-threaded opening through which works a shaft 49, having a threaded portion 47, and provided at its lower end with an annular collar or shoulder 48, which is rigidly held in a pocket between the plates 44 and 45. To the upper end of the shaft 49 is secured a suitable hand wheel 50. A downwardly opening hook 51 is secured to the side members 12 of the tractor bracket, and is adapted to engage the steering rod 3.

Normally the wheel 50 is turned so as to hold the tractor at the upper limit of its movement, as illustrated in Fig. 9, the bracket being then swung upwardly and rearwardly about the trunnions 11, and hooked up to a chain or the like so that ample clearance between the tractor wheels and roadway will be provided. The relative position and proportion of the parts 3 and 51 is such that this swinging movement is permitted. When it is desired to use the tractor, it is first swung back to vertical position, as shown in Fig. 9, and then the shaft 49 turned so as to force the tractor down upon the roadway, the rods 43 acting as guides to hold the plates 44 and 45 against rotation and insure their true vertical movement. It will be understood that as the tractor is forced downwardly, the hook 51 engages over the steering rod 3, and that in its final position the front wheels of the vehicle are lifted clear of the ground.

The above described screw shaft arrangement is particularly applicable to electrically driven vehicles because in such vehicles there is no engine or transmission shaft, thus leaving a free space which can be occupied by the shaft 49.

It will, of course, be understood that other forms of mechanism operated by either screws, levers, or cams, may be designed for positively raising and lowering the tractor from the driver's seat, such mechanism being actuated either manually or by power. The more or less conventional showing of Figs. 8, 9, and 10 is to be regarded as illustrative only.

It will therefore be seen that we contemplate an auxiliary tractor device which can be readily attached to the existing types of motor vehicles and which can be so controlled and operated as to lift the front wheels of the vehicle clear of the roadway and swing the front of the vehicle laterally, as may be necessary to effect a short turn or to avoid an obstruction. It is thought that the numerous advantages of the invention, as well as the many obvious modifications thereof which may suggest themselves to those skilled in the art, will be apparent without further discussion.

What we claim is:

1. The combination with a vehicle of an auxiliary tractor device therefor, said device including a bracket pivotally secured to an axle of the vehicle to swing about a vertical axis, said bracket comprising a pair of vertical side members, a horizontal shaft passing through the lower end of said members, a pair of rigidly united, spaced ground wheels mounted on said shaft between said side members, a worm wheel located between said ground wheels and rigid therewith, and a horizontal worm engaging said worm wheel and journaled in said bracket.

2. The combination with a motor vehicle having the usual front wheels and steering gear therefor, including a horizontal steering rod, of a bracket secured to said vehicle between said wheels, said bracket being pivoted to swing rearwardly about a horizontal axis, a tractor wheel journaled in said bracket, and a forwardly projecting arm carried by said bracket and having means to engage said steering rod when said bracket is swung into vertical, operative position.

3. The combination with a vehicle having the usual wheels, of a bracket pivotally secured to the front axle thereof, an auxiliary tractor wheel mounted at the lower end of said bracket and adapted to be brought into engagement with the ground, and a motor operatively geared to said tractor wheel, said motor being also mounted on said bracket and partaking of the pivotal movements thereof.

In testimony whereof we have affixed our signatures in presence of witnesses.

GEORGE H. DAVIS.
WILLIAM G. GRIFFIN.

Witnesses as to Davis:
C. B. BURROWES,
H. R. SEAVEY.
Witnesses as to Griffin:
ROBERT WATSON,
J. H. BOYDEN.